United States Patent [19]

Jones et al.

[11] Patent Number: 5,411,226
[45] Date of Patent: May 2, 1995

[54] SPACECRAFT ADAPTER AND DISPENSER

[75] Inventors: Ernest R. Jones, Ormond Beach, Fla.; James P. Foley, Yardley; Robert K. Dockstader, Jr., Morrisville, both of Pa.

[73] Assignee: Martin Marietta Corporation, East Windsor

[21] Appl. No.: 139,892

[22] Filed: Oct. 13, 1993

[51] Int. Cl.⁶ ............................. B64G 1/64; B64G 1/10
[52] U.S. Cl. .................................. 244/158 R; 244/161
[58] Field of Search ................ 244/158 R, 159, 161, 244/137.1, 137.4; 89/1.819, 1.58

[56] References Cited

U.S. PATENT DOCUMENTS

| | | | |
|---|---|---|---|
| 3,048,107 | 8/1962 | Samms | 102/49 |
| 3,362,290 | 1/1968 | Carr | 89/1 |
| 3,380,687 | 4/1968 | Wrench et al. | 244/158 R |
| 3,420,470 | 1/1969 | Meyer | 244/1 |
| 3,513,512 | 5/1970 | Phillips | 24/279 |
| 3,652,042 | 3/1972 | Wether | 244/158 R |
| 4,067,308 | 1/1978 | Anderson et al. | 244/158 R |
| 4,333,384 | 6/1982 | Arnold | 244/137.4 |
| 4,715,565 | 12/1987 | Wittmann | 244/158 |
| 4,964,596 | 10/1990 | Ganssle | 244/158 |
| 5,152,482 | 10/1992 | Perkins et al. | 244/158 |
| 5,199,672 | 4/1993 | King et al. | 244/158 R |

Primary Examiner—Galen L. Barefoot
Attorney, Agent, or Firm—W. H. Meise; C. A. Berard; S. A. Young

[57] ABSTRACT

A lift vehicle has an elongated support structure affixed to its upper end, with the axis of elongation of the support structure parallel to or coincident with the longitudinal axis of the lift vehicle. The support structure defines a plurality of attachment planes, each of which includes the axis of elongation, which together divide the region about the axis of elongation into N angular sections or regions, each with an included angle of 360°/N. A plurality MN of spacecraft are organized into a plurality of M sets or layers, each containing N spacecraft. Each spacecraft defines first and second lateral support planes, skewed relative to each other, which intersect at a line of intersection, is parallel to the axis of elongation when the spacecraft are mounted to the support structure. Two or more spacecraft are mounted in end-to-end position in each angular portion. Each spacecraft stiffens the support structure, so that the stiffened support structure, can sustain the launch forces. Spacecraft of upper layers do not bear on lower layers. Controllable attachments hold the first and second lateral support planes of each spacecraft adjacent to the attachment planes defined by the support structure.

20 Claims, 5 Drawing Sheets

5,411,226

SPACECRAFT ADAPTER AND DISPENSER

FIELD OF THE INVENTION

This invention relates to spacecraft launch arrangements, and more particularly to arrangements for lifting a plurality of spacecraft by means of a single launch or lift vehicle.

BACKGROUND OF THE INVENTION

At one time, each spacecraft to be placed in orbit was launched by its own lift vehicle. As lift vehicles became larger, pairs of spacecraft could be stacked, one atop the other, at the upper end of the launch vehicle, within a common fairing or shroud. The lower spacecraft was supported directly by the payload support ring of the launch vehicle, and the upper spacecraft was supported by a support structure extending from the support ring and holding the upper spacecraft away from the lower spacecraft. Lately, there has been an increased need for small spacecraft. Improved spacecraft launch and dispensing arrangements are desired.

SUMMARY OF THE INVENTION

A lift vehicle has an elongated support structure affixed to its upper end, with the axis of elongation of the support structure parallel to or coincident with the longitudinal axis of the lift vehicle. The support structure defines a plurality of attachment planes, each of which includes the axis of elongation, which together divide the region about the axis of elongation into N angular sections or regions, each with an included angle of 360°/N. A plurality MN of spacecraft are organized into a plurality of M sets, each containing N spacecraft. Each spacecraft defines first and second lateral support planes, skewed relative to each other. The first and second lateral support planes for each spacecraft intersect at a line of intersection, which is parallel to the axis of elongation when the spacecraft are mounted to the support structure. Two or more spacecraft are mounted in end-to-end position in each angular portion. The spacecraft of each of the M sets are located in one "layer". Each spacecraft stiffens the support structure, so that the support structure, stiffened by the spacecraft of the lower layers, is capable of sustaining the launch forces imparted to the upper layers. While each spacecraft stiffens the support structure, spacecraft of upper layers do not directly bear on spacecraft of lower layers. Controllable attachments hold the first and second lateral support planes of each spacecraft adjacent to the attachment planes defined by the support structure. In one embodiment, N=3, M=6, whereby the support structure defines three angular sections, each occupied by two spacecraft. According to another embodiment of the invention, the total lengths of the spacecraft in each angular section are equal. The attachments may include explosive bolts or circumferential bands.

DESCRIPTION OF THE INVENTION

Figure 1:
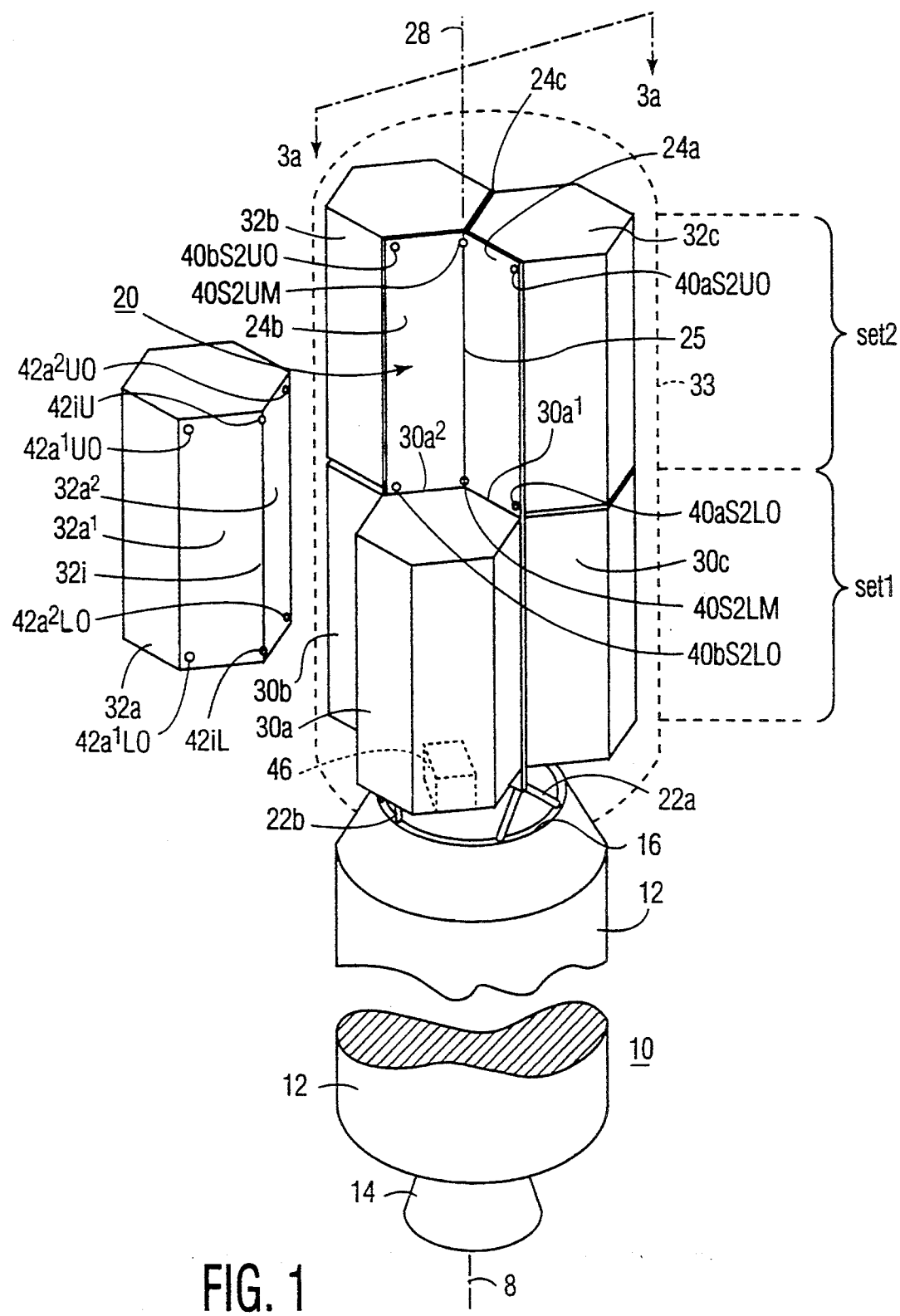
FIG. 1 is a perspective or isometric view of a simplified arrangement according to the invention, including a lift vehicle, support structure, and a load including a plurality of spacecraft, with one of the spacecraft exploded away from the support structure to illustrate interior details.
Figure 2A:
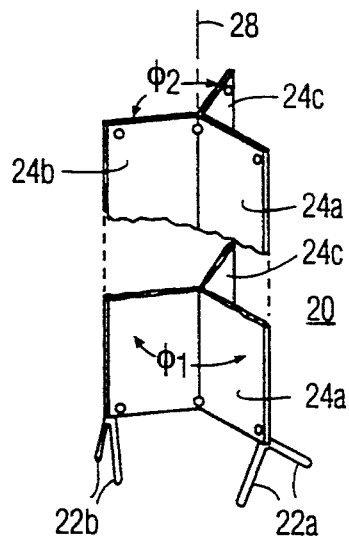
FIG. 2a is a perspective or isometric view of a portion of a support structure according to an embodiment of the invention.
Figure 2B:
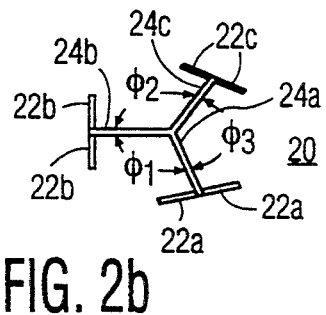
FIG. 2b is an end view thereof.

FIG. 1 illustrates a launch vehicle stage 10 including a body 12 centered on a longitudinal axis 8, and also including a lower end to which is affixed a thruster nozzle 14, and further including an upper end terminating at a payload support ring 16. A spacecraft support structure designated generally as 20, illustrated separately in FIGS. 2a and 2b, is connected by sets of legs 22a, 22b and 22c to support ring 16. A first set 1 of three spacecraft 30a, 30b and 30c is mounted to a lower level of support structure 20, and a second set 2 of three spacecraft 32a, 32b and 32c is mounted to an upper level of support structure 20. A releasable shroud or fairing 33, illustrated by a dash line, surrounds the spacecraft to form a streamlined shape, as is known in the art.

Support structure 20 as illustrated in FIGS. 1, 2a, and 2b, includes three elongated planar support plates 24a, 24b and 24c. As described below, the entirety of each support plate 24 is not necessarily used in arrangements according to the invention as described below in conjunction with FIGS. 5a and 5b, and the "plates" are referred to as "planes" for reasons which are made apparent below. Elongated planes 24a, 24b and 24c intersect along a line of intersection 25, which is coincident with an axis of elongation 28, and which is ideally also coincident with longitudinal axis 8 of lift vehicle 10 of FIG. 1.

As illustrated in the end views of FIGS. 2b and 2c, planes 22a, 22b and 22c divide the surrounding spatial region into three angular sectors or segments designated $\phi_1$, $\phi_2$ and $\phi_3$, where angular segment $\phi_1$ is defined between planes 24a and 24b, angular segment $\phi_2$ is defined between planes 24b and 24c, and angular segment $\phi_3$ is defined between planes 24a and 24c. The angles of angular segments $\phi_1$, $\phi_2$ and $\phi_3$ are preferably equal. For the illustrated case of three segments, $\phi_1 = \phi_2 = \phi_3 = 120°$.

Referring once again to FIG. 1, a first set of three spacecraft 30a, 30b and 30c is illustrated, mounted to support structure 20 close to the bottom (adjacent to support ring 16) of the support structure. As illustrated, each spacecraft 30a, 30b and 30c is elongated in a direction parallel to axis of elongation 28, and has a hexagonal cross-section better seen in FIG. 3a. Such a hexagonal shape may result from the use of side panels for support of solar cell arrays for powering the spacecraft. Each spacecraft, such as spacecraft 30a, has first ($32a^1$) and second ($32a_2$) lateral or side surfaces which, when the spacecraft is mounted to support structure 20, abut or are contiguous with adjacent ones of planes 24 of the support structure. Contiguous, in this context, means immediately adjacent to and in actual contact, or immediately adjacent to and not in contact. More particularly, spacecraft 30a has a first lateral support plane $30^1$ contiguous with plane 24a, and a second lateral support surface $30^2$ contiguous with support plane 24b. When so mounted, line of interaction 32i of planes $32a^1$ and $32a^2$ parallels line of intersection 25 of planes 24a and 24b of support structure 20. The presence of spacecraft 30a affixed to planes 24a and 24b of support structure 20 reinforces the support structure against buckling by completing a triangular form, as suggested by dash line 310 in FIG. 3a. The presence of spacecraft 30c provides further support for plane 24a, so that support structure 20 is stronger with spacecraft 30a, 30b and 30c attached than it would otherwise be.

Figure 3A:
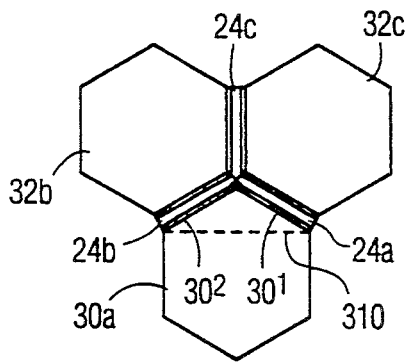
FIG. 3a is a simplified end view of the arrangement of FIG. 1, and FIG. 3b and 3c are side elevation views of the structure of FIG. 1 with all spacecraft mounted, FIG. 3b looking into an angular section, and FIG. 3c looking at an edge of a portion of the support structure.

As illustrated in FIG. 1, all spacecraft 30a, 30b and 30c of set 1 have the same length parallel to axis 28. A second set, designated set 2, of three spacecraft 32a, 32b and 32c is intended for mounting to support structure 20, and is illustrated as being so mounted in FIGS. 3b and 3c, while in FIG. 1 spacecraft 32a is illustrated separately, exploded away from support structure 20. Spacecraft 30a, 30b and 30c of set 1 of FIG. 1 have lengths parallel to axis of elongation 28 which are equal among themselves, and which are also equal to the lengths of spacecraft 32a, 32b and 32c of set 2 of FIG. 1. The equal lengths can be seen better in the side elevation views of FIGS. 3a and 3b.

In FIG. 1, an attachment device, represented by a circle designated 40aS2UO, is located on plane 24a of support structure 2, at a set 2 (S2) upper outboard (UO) position, and mates, when spacecraft 32a of upper set 2 is mounted to support structure 20 with its lateral support surface or plane $32a^1$ contiguous with plane 24a and with its support surface $32a^2$ contiguous with plane 24b, with corresponding mating attachment device $42a^1$UO, mounted on lateral support plane $32a^1$ of spacecraft 32a, at the upper outboard position. In this context, the word "outboard" when referring to support structure 20 refers to a location remote from line of intersection 25, and when referring to spacecraft 32a, means a position remote from line of intersection 32i. Similarly, an attachment device 40aS2LO is located on plane 24a of support structure 20, at a S2 lower outboard (LO) position, and mates with a corresponding attachment device $42a^1$LO on plane $32a^1$ of spacecraft 32a. Upper and lower attachment devices 40bS2UO and 40bS2LO are located on support plane 24b, at set S2, upper and lower outboard positions, respectively, and mate with corresponding attachment devices $42a^2$UO and $42a^2$LO located on lateral support plane $32a^2$ of spacecraft 32a. In addition to the attachment devices described above, two additional attachment devices 40S2UM and 40S2LM are located at set 2, upper middle (UM) and lower middle (LM) positions, respectively, on line of intersection 25 of support structure 20, and mate with corresponding attachment devices 42iU and 42iL located on intersection line 32i of spacecraft 32a at upper and lower positions, respectively. Note that attachment devices 40S2UM and 40SLUL lie in both planes 24a and 24b. When mated, pairs of attachment devices, such as pairs 40aS2UO, $42a^1$UO; 40bS2LO, $42a^2$LO, and 40S2UM, 42iU, at least provide resistance against shear forces acting perpendicular to their lines of action as described below. As known, the attachment devices, when mated, may also resist forces in all directions. For example, cup-cone fittings or attachment devices resist shear transverse to the line of action but do not resist tension, while attachment devices such as explosive bolts resist both shear and tension. It should be noted that the use of all six attachments with each spacecraft, as illustrated in FIG. 1, creates two support triangles such as that described in conjunction with FIG. 3a, one near the upper region of the spacecraft, and another at a lower region.

In operation, the spacecraft 30, 32 of FIG. 1 are mounted on lift vehicle 10 and attached to the support structure 20. Streamlined fairing 33 is then added. The lift vehicle is then fueled, if necessary, and the engine is ignited to operate the engine, for sending the vehicle and its payload into space. As known, the lift vehicle may consist of one or more stages, which may be ignited or operated in sequence to achieve the desired altitude or altitudes at which the spacecraft load is to be dispensed. When an altitude is reached at which atmospheric drag forces are small, fairing 33 is separated and allowed to fall away, thereby exposing the support structure and the spacecraft load. The attachment or restraining devices for each spacecraft are released when the desired altitude for release is reached. Each spacecraft ordinarily includes its own command signal or telemetry receiver. In FIG. 1, the command receiver in each spacecraft is represented by a command receiver, illustrated by a phantom block 46, associated with spacecraft 30a. Such command receivers may be connected to the spacecraft-to-lift-vehicle restraining devices(s), if different from the attachment devices, so that each spacecraft 30, 32 may be individually released from the support structure 20. By simultaneous transmission of release commands to a group of, or to all of the spacecraft, that group, or all of the spacecraft may be released simultaneously. If the attached portion of launch vehicle 10 (i.e. the upper stage, if the launch vehicle is a multistage vehicle) is spinning about its longitudinal axis at the time of release of a spacecraft 30 or 32, the centrifugal forces or inertia resulting from the spin will cause the released spacecraft to move radially away from the support structure, and no further action needs to be taken to dispense the spacecraft.

If the launch vehicle (or its upper stage) is not spinning at the time a spacecraft is released, some means other than spin must be provided to impart an inertial or reaction force to the spacecraft, to move it away from the support structure. One simple method is to compress one or more springs (not illustrated) during the mounting of each spacecraft to the support structure, so that when the attachment devices are released, the force of the compressed spring(s) pushes the spacecraft away from the support structure. If explosive bolts are used, the explosive force itself may be sufficient to create motion which separates the spacecraft from the support structure. Another alternative is to energize or fire one or more of the attitude control or stationkeeping (or other) thrusters associated with the spacecraft, although this may create a danger of damage to other spacecraft not yet released at the time of the firing.

Figure 3B:
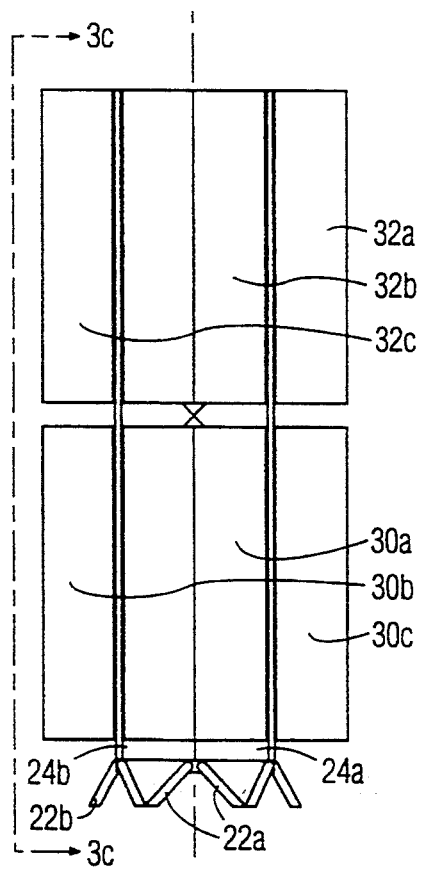
Figure 3C:
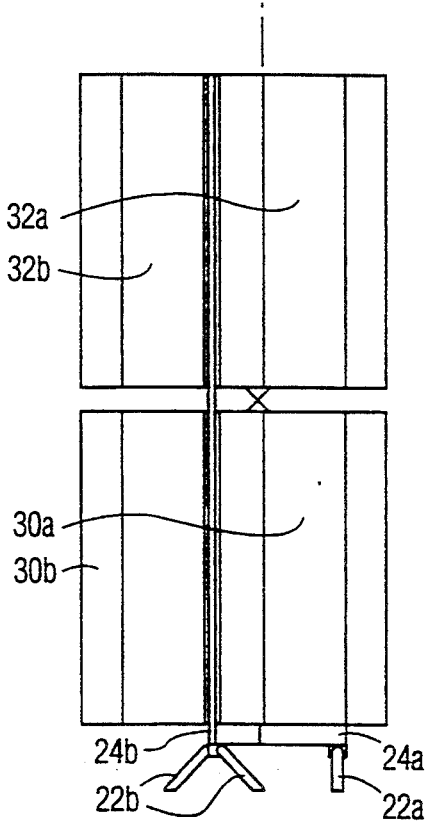
Figure 4:
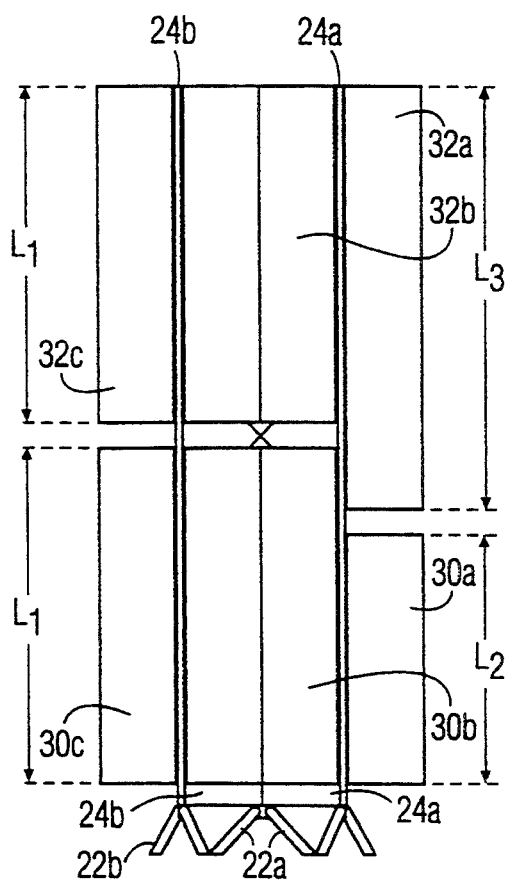
FIG. 4 is a view similar to that of FIG. 3b, when the spacecraft of one section have unequal axial lengths, but a total length equal to that of the spacecraft in other angular sections.

FIG. 4 is similar to FIG. 3b, and corresponding elements are designated by like reference numerals. In FIG. 4, spacecraft 30b and 30c of lower set 1 each have longitudinal length L1, and spacecraft 32b and 32c of upper spacecraft set S2 also each have length L1, so that the overall length of the spacecraft load is 2L1 in angular sectors 24a/24b and 24b/24c, lying between support planes 24a and 24b, and between support planes 24b and 24c, respectively. There is no requirement of equal spacecraft lengths, however, since the only restriction on length is that the sum of the lengths of the spacecraft in any angular sector be such as to fit under the shroud or fairing (33 of FIG. 1). Thus, spacecraft 30a is illustrated in FIG. 4 as having length $L_2$ less than $L_1$, and spacecraft 32a in the same angular sector is illustrated as having a length $L_3$, such that $L_2+L_3=2L_1$. However, spacecraft 32a could have a length of $L_1$, if desired, or even $L_2$, so that the sum of the lengths of spacecraft 30a and 32a would in that case be shorter than $2L_1$.

Figure 5A:
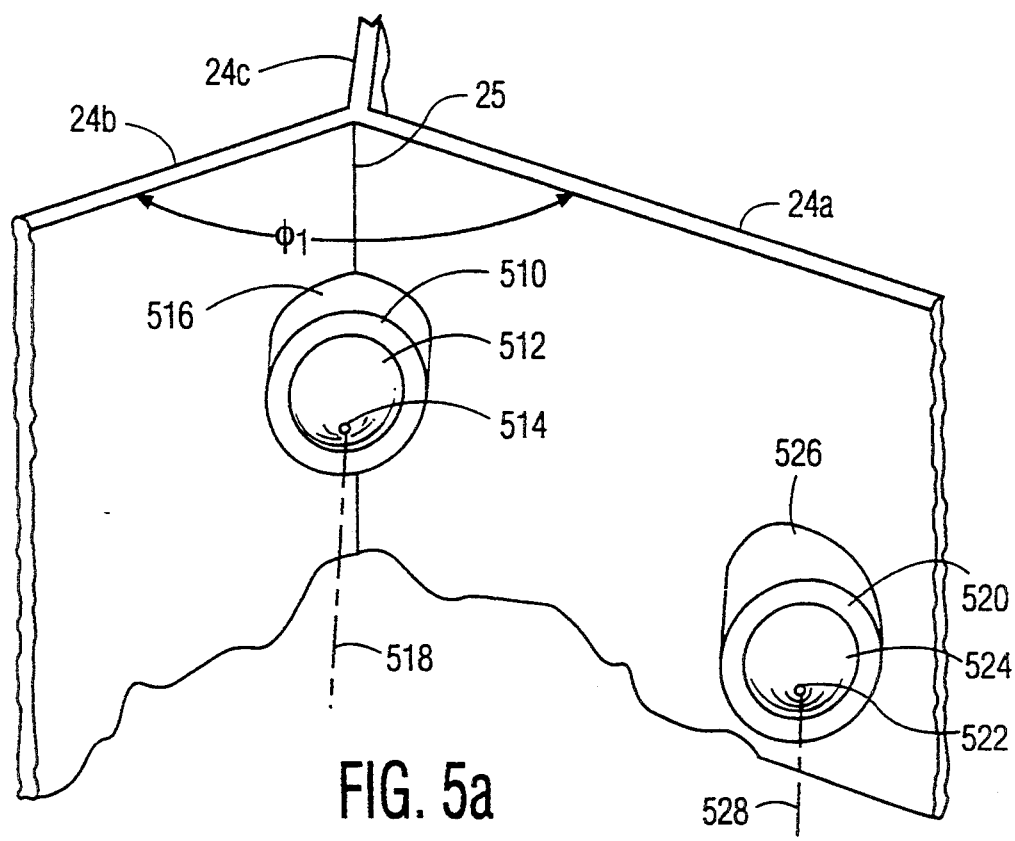
FIG. 5a is a detailed perspective or isometric view of two of the attachment devices of FIG. 1 which may be used for affixing spacecraft to t,he support structure of FIG. 1.
Figure 5B:
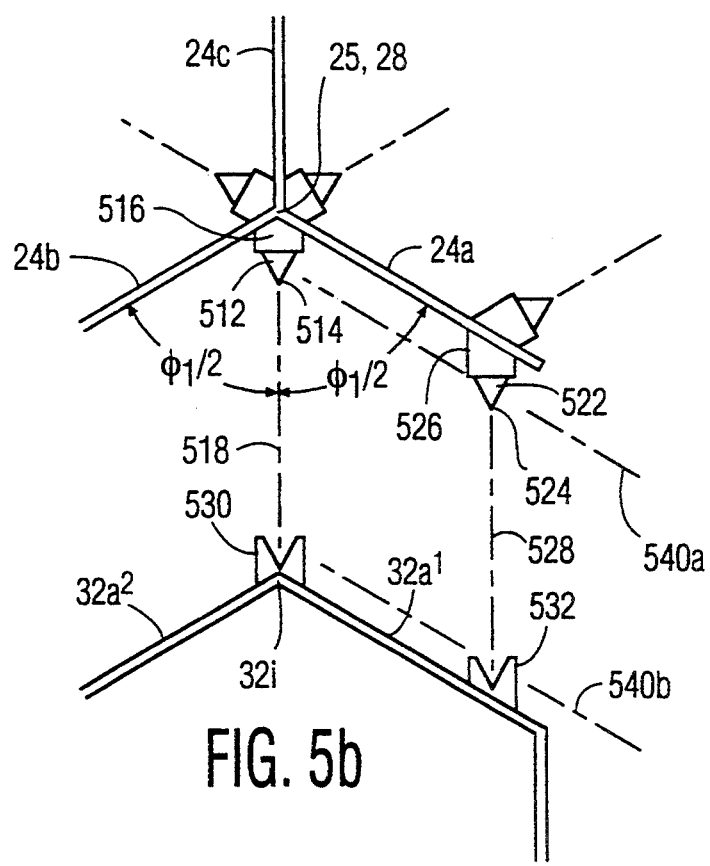
FIG. 5b illustrates lines of action of the attachments of FIG. 5a and their mates.

FIGS. 5a and 5b are details illustrating a cup-and-cone shear resisting device which may be used in the arrangement of FIGS. 1, 3a. As illustrated in FIG. 5a, a first attachment cone arrangement 510 is affixed to support panels 24a and 24b adjacent line of intersection 25. Arrangement 510 includes a cone 512 having a tip 514, mounted on a platform 516 shaped to mount cone 512 with a line of action 518 (FIG. 5b), which extends through its tip 515 normal to its base (not illustrated), bisecting the angle $\phi_1$ between plates 24a and 24b. Thus, the angles between line of action 518 and planes 24a and 24b are both $\phi_1/2$. A similar attachment device 520 includes cone 522 with a tip 524, mounted on a base 526 which sets it line of action 528 parallel to line of action 518 of attachment device 510. FIG. 5b illustrates a cup 530 mounted at the intersection 32i of both lateral support plates $32a^1$ of spacecraft 32a and $32a^2$, and cup 532 mounted on plate $32a^1$ both with their lines of action 518, 528, respectively, parallel. Cups 530 and 532 mate with cones 512 and 522, to resist forces acting transverse to their lines of action 518, 528.

FIG. 5b also illustrates other attachment cones (not separately designated) for angular sectors bounded by plates pairs 24a, 24c and 24b, 24c. FIG. 5b also indicates the reason for the distinction between support plates and support planes. The actual support plane associated with cones 512, 522 and cups 530, 532 is coincident with neither lateral support plate $32a^1$ nor support plate 24, but lies somewhere between the two, at a location suggested by dot-dash lines 540a and 540b, which are coincident when full mating of the attachment devices occurs. Conceptually, however, the thickness of the attachment devices, plates and other interface devices may be ignored, whereupon the attachment plane corresponds to the center planes of the corresponding support plate 24a and lateral support plate $32a^1$.

Figure 6:
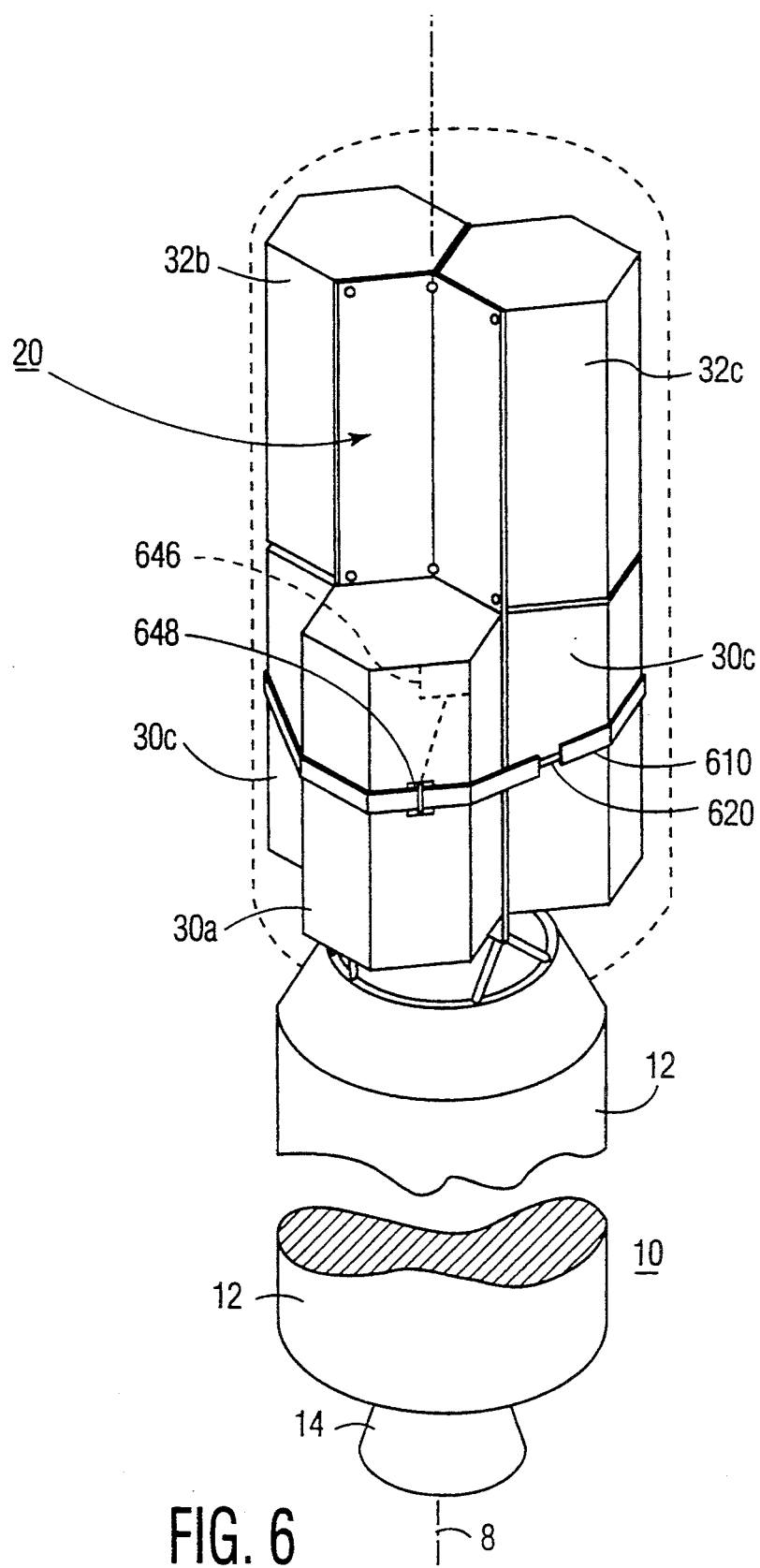
FIG. 6 is similar to FIG. 1, and illustrates a circumferential restraining band.

FIG. 6 is similar to FIG. 1, except in that the three spacecraft 30a, 30b and 30c of lower set 1 are restrained against radial motion by a circumferential strap 610, tensioned by a turnbuckle 620. Such a strap might be used when all three spacecraft of set 1 are to be dispensed simultaneously. Such a strap obviates the need for a plurality of release devices. As illustrated, the command signal receiver of spacecraft 30a, suggested by box 646, may be connected to a strap cutting device suggested by 648. Thus, when the desired orbit is achieved, a command is transmitted to receiver 646 of spacecraft 30a, which commands cutting of strap 610 by device 648. The strap, when cut, frees all three spacecraft 30a, 30b and 30c from support structure 20, so that they may move away from the launch vehicle as a result of spin, as described above, or as a result of spring or other method for imparting a force.

As so far described, spacecraft 30 and 32 have the shape of a hexagonal or six-sided prism. This shape is particularly useful when solar arrays are to be mounted on a rotating spacecraft, because solar cells may be difficult to apply to a curved surface. The spacecraft rotation during normal operation successively brings at least one of the solar panels into illumination. As described above in conjunction with FIGS. 1, 5a and 5b, the support panels of the spacecraft do not actually contact support structure 20, and in fact such contact might damages some of the solar cells mounted on the lateral support panels. Instead, the contact occurs only at specific locations at which attachment devices are located. Having three attachment locations at an upper position of the spacecraft, corresponding to positions $42a^1$UO, $42i$U, and $42a^2$UO of spacecraft 32a of FIG. 1, and three attachment locations at a lower portion of the spacecraft, corresponding to positions $42a^1$LO, $42i$L, and $42a^2$LO, associates each spacecraft with two separate stiffening or reinforcing "triangles", such as that discussed in relation to line 310 of FIG. 3a. Those skilled in the art will recognize that the stiffening is not dependent upon the presence of actual lateral support panels on the spacecraft. Those skilled in the art also realize that many spacecraft have no hard "hell", as might be suggested by the drawings, but rather generally have a structure dictated by the function, with various substructures such as tanks, engines or thrusters, communications boxes, tubing, wiring, interconnecting struts and the like all exposed. Thus, the illustrated "shell" of the spacecraft is not necessary to the invention.

Figures 7A, 7B:
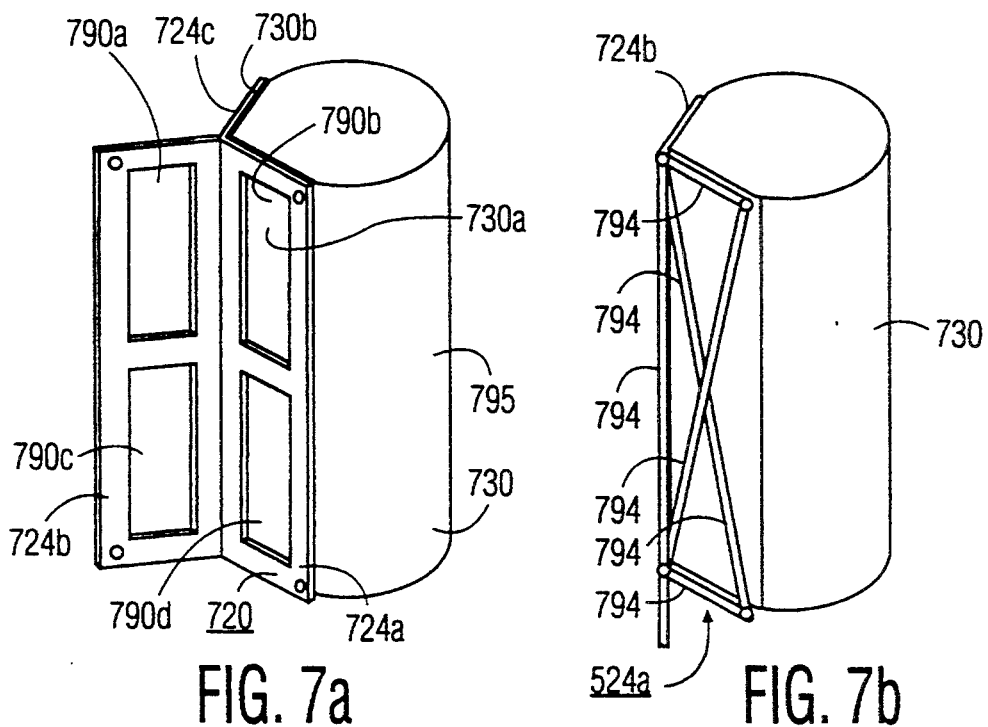
FIG. 7a is a simplified perspective or isometric view of a skeletonized support structure, and of a spacecraft in which the cross-sectional shape is not regular.
FIG. 7b illustrates further skeletonization.

FIG. 7a illustrates a portion of a support structure 720 corresponding to a part of support structure 20 of FIGS. 1, 2a, or 2b, skeletonized by a plurality of fenestrations or windows 790a, 790b, 790c and 790d. In FIG. 7a, a spacecraft 730 defines a first lateral support plane 730a, visible through windows 790b and 790d, and a second lateral support plane 730b, only the edge of which is visible. As in the case of FIGS. 1 and 3a, lateral support planes 730a and 730b of spacecraft 730 make an external angle of 240°, to fit into the 120° interior angle between planes 724a and 724c.

In the arrangement of FIG. 7a, only that portion of spacecraft 730 which interfaces or is contiguous with support planes 724 of support structure 720 is configured with two planar lateral support surfaces 730a, 730b, and the remainder, part of which is designated 795, may be of any shape, so long as it fits within the streamlining shroud (not illustrated in FIG. 7a). In FIG. 7a, remainder 795 is illustrated as having a circular cylindrical shape. FIG. 7b is similar to FIG. 7a, except the support planes, including support plane 724, is further skeletonized, so as to simply be a plurality of interconnected struts 794.

A major advantage of the invention is that the physical structure for supporting the spacecraft during launch does not by itself have to bear the mass times acceleration forces occurring during launch, but support structure 20 forms part of a structure which, together with the spacecraft, defines a structure with a triangular cross-section, which is capable of sustaining the forces without buckling. This maybe better understood by considering the situation of FIGS. 3b and 3c, without the lower set of spacecraft 30a, 30b and 30c; such an arrangement would put the forces attributable to the upper three spacecraft on support structure 20 alone. While support structure 20 could be made strong enough to sustain the load without buckling, such a structure would be much heavier than support structure 20 as illustrated. The additional weight, as known, is extremely disadvantageous, because it reduces the amount of the useful "live" payload (the payload which can be released into orbit). According to the invention, the structure of the three lower spacecraft stiffens and supports support structure 20, thereby enabling it to withstand the load of the three upper spacecraft of set 2, without reducing the live payload. Another way of looking at the invention is that the lower set of spacecraft carry part, but not all, of the load of the upper set of spacecraft.

Other embodiments of the invention will be apparent to those skilled in the art. For example, the number of attachment plates or planes may be other than three; with four attachment planes, each angular segment has an included angle of 90°. While six attachment devices have been described as being associated with each spacecraft, more or fewer attachment devices may be used, as appropriate. In general, no less than three attachment devices are required to prevent motion in three dimensions. While FIG. 1 illustrates lift vehicle 10 as a single-stage vehicle, it may be a multiple-stage vehicle. While only first and second sets of spacecraft have been explicitly described, occupying upper and lower mounted positions, three or more sets of spacecraft may be loaded in three or more layers in a similar manner. While the command receiver(s) for control of the dispensing of the spacecraft have been described as being located within one or more of the spacecraft themselves, the dispensing control receiver may instead be associated with the lift vehicle.

What is claimed is:

1. A spacecraft launch arrangement for a plurality of spacecraft;
   a lift vehicle defining a longitudinal axis substantially coincident with a thrust axis, and also defining an upper end;
   an elongated support structure affixed to said upper end of said lift vehicle, said support structure defining an axis of elongation parallel with said longitudinal axis of said lift vehicle, said support structure being associated with a plurality of attachment planes, each of which attachment planes contains said axis of elongation, said attachment planes dividing a region about said axis of elongation into a predetermined number N of angular regions, each having an angular extent about said axis of elongation equal to 360°/N;
   a plurality MN of spacecraft organized into a plurality of M sets, each of said M sets of spacecraft including a plurality N of spacecraft, each of said spacecraft defining first and second lateral support planes, said first and second lateral support planes of each of said spacecraft being mutually disposed at an external angle equal to 360°/N, whereby said first and second lateral support planes of each of said spacecraft intersect along a line of intersection, which line of intersection, when any one of said spacecraft is mounted to said support structure of said lift vehicle, lies parallel to said axis of elongation of said support structure, to thereby define upper and lower ends of said spacecraft and to also define a spacecraft length between said upper and lower ends, whereby, when said N spacecraft of one of said sets of spacecraft are mounted to said support structure of said lift vehicle, each of said spacecraft lies within one of said angular regions about said axis of elongation, with said first and second lateral support planes of said spacecraft lying contiguous with and parallel with corresponding ones of said attachment planes associated with said support structure;
   first attachment means attached to each of said spacecraft, said first attachment means including attachment devices located in said first and second lateral support planes and near said upper and lower ends of said spacecraft;
   second attachment means attached to said support structure, said second attachment means including mating attachment devices releasably mating with said attachment devices of said first attachment means, said mating attachment devices of said second attachment means being located in said attachment planes associated with said support structure at locations which, when any one of said spacecraft is mounted to said support structure of said lift vehicle at its predetermined location and with said first and second lateral support planes of said one of said spacecraft lying contiguous with and parallel with said corresponding ones of said attachment planes associated with said support structure, correspond to the locations of said attachment devices of said first attachment means, for releasably supporting said spacecraft against at least shear force components acting parallel to a plane in which one of said attachment means is located;
   one of said spacecraft of each of said sets of spacecraft lying in each of said angular regions, with said lower end of at least one of said spacecraft of one of said sets of spacecraft lying adjacent to said upper end of one of said spacecraft of another one of said sets of spacecraft, whereby said spacecraft in each of said angular regions are stacked end-to-end, and the sum of said lengths of those of said spacecraft which lie in any one of said angular regions is substantially equal to the sum of said lengths of those of said spacecraft which lie in another one of said angular regions.

2. A spacecraft launch arrangement according to claim 1, wherein said plurality N equals three.

3. A spacecraft launch arrangement according to claim 1, wherein each of the N spacecraft of any one of said sets of spacecraft has its said length substantially equal to said length of each of the other ones of said spacecraft of said set.

4. A spacecraft launch arrangement according to claim 1, further comprising:
   restraining means coupled to said spacecraft for preventing radial motion, relative to said axis of elongation, of at least some of said spacecraft.

5. A spacecraft launch arrangement according to claim 4, wherein said restraining means comprises circumferential tensioning means.

6. A spacecraft launch arrangement according to claim 5, wherein said circumferential tensioning means comprises a restraining band.

7. A spacecraft launch arrangement according to claim 1, wherein said first attachment means includes a first attachment device located near said upper end and in said line of intersection, whereby said first attachment device lies within said first and second attachment planes.

8. A spacecraft launch arrangement according to claim 1, wherein said first attachment means includes attachment means located (a) near said upper end in said first lateral support plane and remote from said line of intersection, (b) near said lower end in said first lateral support plane and remote from said line of intersection, (c) near said upper end in said second lateral support plane and remote from said line of intersection, (d) near said lower end in said second lateral support plane and remote from said line of intersection.

9. A spacecraft launch arrangement according to claim 1, further comprising control means coupled to at least one of said first and second attachment means for releasing said attachment under control of a control signal.

10. A spacecraft launch arrangement according to claim 9, further comprising reaction means for urging at least one of said spacecraft in a radial direction relative to said axis of elongation.

11. A spacecraft launch arrangement according to claim 10, wherein said reaction means comprises spring means.

12. A spacecraft launch arrangement according to claim 9, wherein said control means further comprises electromagnetic signal receiving means for receiving coded release command signals from a remote location, for processing said release command signals for generating said control signal.

13. A spacecraft launch arrangement according to claim 1, wherein N is three, and M is two, whereby each angular extent is 120°, and said external angle is 240°.

14. A spacecraft launch arrangement, comprising:
a lift vehicle defining an upper end;
a support structure defining a plurality of leaves intersecting along an axis of elongation, said support structure being affixed to said upper end, said support structure having a cross-sectional shape in which said leaves radiate from said axis of elongation to define a first plurality, which plurality exceeds two, of angular segments;
a first set of spacecraft, the number of spacecraft in said first set being equal to said first plurality, each of said spacecraft of said first set being located in one of said angular segments and affixed to two adjacent ones of said leaves, to thereby stiffen said support structure; and
at least a further spacecraft located in one of said angular segments of said support structure and located more remote from said lift vehicle that one of said spacecraft of said first set located in the same one of said angular segments, and contiguous therewith, said further spacecraft being affixed to two adjacent ones of said leaves, for being supported during launch by said support structure stiffened by said first set of spacecraft.

15. A spacecraft launch arrangement for launching a plurality of spacecraft by means of a lift vehicle defining a longitudinal axis substantially coincident with a thrust axis, and also defining an upper end, said arrangement comprising;
an elongated support structure affixed to said upper end of said lift vehicle, said support structure defining an axis of elongation parallel with said longitudinal axis of said lift vehicle; said support structure being associated with a plurality of attachment planes, each of which attachment planes contains said axis of elongation, said attachment planes dividing a region about said axis of elongation into a predetermined number N of angular regions, each having an angular extent about said axis of elongation equal to 360°/N;
a plurality MN of spacecraft organized into a plurality of M sets, each of said M sets of spacecraft including a plurality N of spacecraft, each of said spacecraft defining first and second lateral support planes, said first and second lateral support planes of each of said spacecraft being mutually disposed at an external angle equal to 360°/N, whereby said first and second lateral support planes of each of said spacecraft intersect along a line of intersection, which line of intersection, when any one of said spacecraft is mounted to said support structure of said lift vehicle, lies parallel to said axis of elongation of said support structure, to thereby define upper and lower ends of said spacecraft and to also define a spacecraft length between said upper and lower ends, whereby, when said N spacecraft of one of said sets of spacecraft are mounted to said support structure of said lift vehicle, each of said spacecraft lies within one of said angular regions about said axis of elongation, with said first and second lateral support planes of said spacecraft lying contiguous with and parallel with corresponding ones of said attachment planes associated with said support structure;
first attachment means attached to each of said spacecraft, said first attachment means including attachment devices located in said first and second lateral support planes and near said upper and lower ends of said spacecraft;
second attachment means attached to said support structure, said second attachment means including mating attachment devices releasably mating with said attachment devices of said first attachment means, said mating attachment devices of said second attachment means being located in said attachment planes associated with said support structure at locations which, when any one of said spacecraft is mounted to said support structure of said lift vehicle at its predetermined location and with said first and second lateral support planes of said one of said spacecraft lying contiguous with and parallel with said corresponding ones of said attachment planes associated with said support structure, correspond to the locations of said attachment devices of said first attachment means, for releasably supporting said spacecraft against at least shear force components acting parallel to a plane in which one of said attachment means is located;
one of said spacecraft of each of said sets of spacecraft lying in each of said angular regions, with said lower end of at least one of said spacecraft of one of said sets of spacecraft lying adjacent to said upper end of one of said spacecraft of another one of said sets of spacecraft, whereby said spacecraft in each of said angular regions are stacked end-to-end, and the sum of said lengths of those of said spacecraft which lie in any one of said angular regions is substantially equal to the sum of said lengths of those of said spacecraft which lie in another one of said angular regions.

16. A spacecraft launch arrangement according to claim 15, wherein said plurality N equals three.

17. A spacecraft launch arrangement according to claim 15, wherein each of the N spacecraft of any one of said sets of spacecraft has its said length substantially equal to said length of each of the other ones of said spacecraft of said set.

18. A spacecraft launch arrangement according to claim 15, further comprising:
   restraining means coupled to said spacecraft for preventing radial motion, relative to said axis of elongation, of at least some of said spacecraft.

19. A spacecraft launch arrangement according to claim 18, wherein said restraining means comprises circumferential tensioning means.

20. A spacecraft launch arrangement according to claim 19, wherein said circumferential tensioning means comprises a restraining band.

* * * * *